United States Patent
Hwang

(10) Patent No.: US 6,530,785 B1
(45) Date of Patent: Mar. 11, 2003

(54) PACKING MEANS FOR SMALL FORM-FACTOR MODULE

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/020,530

(22) Filed: Dec. 18, 2001

(51) Int. Cl.[7] .............................................. H01R 12/00
(52) U.S. Cl. ...................... 439/76.1; 439/358; 439/359
(58) Field of Search ............................. 439/76.1, 108, 439/607, 608, 609, 610, 359, 357, 358

(56) References Cited

U.S. PATENT DOCUMENTS

| | | | |
|---|---|---|---|
| 5,073,130 A | * 12/1991 | Nakamura | 439/607 |
| 5,839,907 A | * 11/1998 | Kuo | 439/76.1 |
| 6,083,049 A | * 7/2000 | Kuo et al. | 439/610 |
| 6,290,530 B1 | * 9/2001 | Chang | 439/378 |
| 6,347,954 B1 | * 2/2002 | Jones et al. | 439/358 |

* cited by examiner

*Primary Examiner*—P. Austin Bradley
*Assistant Examiner*—Alexander Gilman
(74) *Attorney, Agent, or Firm*—Wei Te Chung

(57) ABSTRACT

Means to firmly pack an SFP module. The means comprises an upper cover (4) and a lower cover (5). The upper cover comprises an upper plate (41), two sidewalls (42) integrally depending from the upper plate, and a bottom plate (43) formed between front portions of the sidewalls. The lower cover has a main panel (50). A pair of flanges (52) extends from opposite longitudinal sides of the main panel respectively. Two elbow-shaped locking tabs (424) integrally depend from respective opposite bottom edges of the sidewalls of the upper cover. A pair of symmetric elbow-shaped cutouts (51) is respectively defined in opposite sides of a front portion of the lower cover, for extension of the elbow-shaped locking tabs of the upper cover therethrough.

18 Claims, 5 Drawing Sheets

PACKING MEANS FOR SMALL FORM-FACTOR MODULE

BACKGROUND OF THE INVENTION

1. Field of the Invention

The present invention relates to small form-factor pluggable (SFP) modules, and more particularly to means for firmly and securely packing such modules.

2. Description of Related Art

Nowadays SFP transceivers are being more and more widely used for bi-directional transmission of data between an electrical interface and an optical data link. An SFP transceiver receives electrically encoded data signals, converts them into optical signals, and transmits the optical signals over the optical data link. The SFP transceiver also receives optically encoded data signals, converts them into electrical signals, and transmits the electrical signals onto the electrical interface.

U.S. Pat. No. 6,178,096 discloses an SFP transceiver module. The SFP module is encased in an enclosure which comprises first and second covers made of electrically conductive material. Each first and second cover has a generally planar main wall parallel to and spaced from a printed circuit board (PCB) of the module. Each major wall extends between and at least partially covers insulative housings of a module plug and a receptacle located at respective opposite ends of the PCB. Each first and second cover also has a pair of opposite sidewalls orthogonal to the main wall and adjacent respective opposite edges of the PCB. The sidewalls of the first and second covers have complementary engaging structures, so that the first and second covers can be placed over opposite faces of the PCB and clasped together to encase the PCB. Each of the sidewalls is also formed with a respective ledge which is parallel to and open toward a respective main wall. Two latch members are also provided. Each latch member cooperates with a respective pair of sidewalls adjacent a respective edge of the PCB. Each latch member has a bifurcated portion adapted to engage a respective opposed ledge on each sidewall of the respective pair of sidewalls, to prevent separation of the first and second covers. Unfortunately, engagement between the first and second covers is not firm. The first and second covers are liable to be dislodged.

Thus, it is desired to provide improved packing means for an SFP transceiver module which prevents dislodgement of covers of the module.

SUMMARY OF THE INVENTION

Accordingly, an object of the present invention is to provide firm and secure packing means for an SFP module.

To achieve the above object, the present invention provides means to firmly pack an SFP module. The means comprises an upper cover and a lower cover. The upper cover comprises an upper plate, two sidewalls integrally depending from the upper plate, and a bottom plate formed between front portions of the sidewalls. The lower cover has a main panel. A pair of flanges extends from opposite longitudinal sides of the main panel respectively. Two elbow-shaped locking tabs integrally depend from respective opposite bottom edges of the sidewalls of the upper cover. A pair of symmetric elbow-shaped cutouts is respectively defined in opposite sides of a front portion of the lower cover, for extension of the elbow-shaped locking tabs of the upper cover therethrough.

Other objects, advantages and novel features of the present invention will be drawn from the following detailed description of a preferred embodiment of the present invention with attached drawings, in which:

DETAILED DESCRIPTION OF PREFERRED EMBODIMENT

Figure 1:
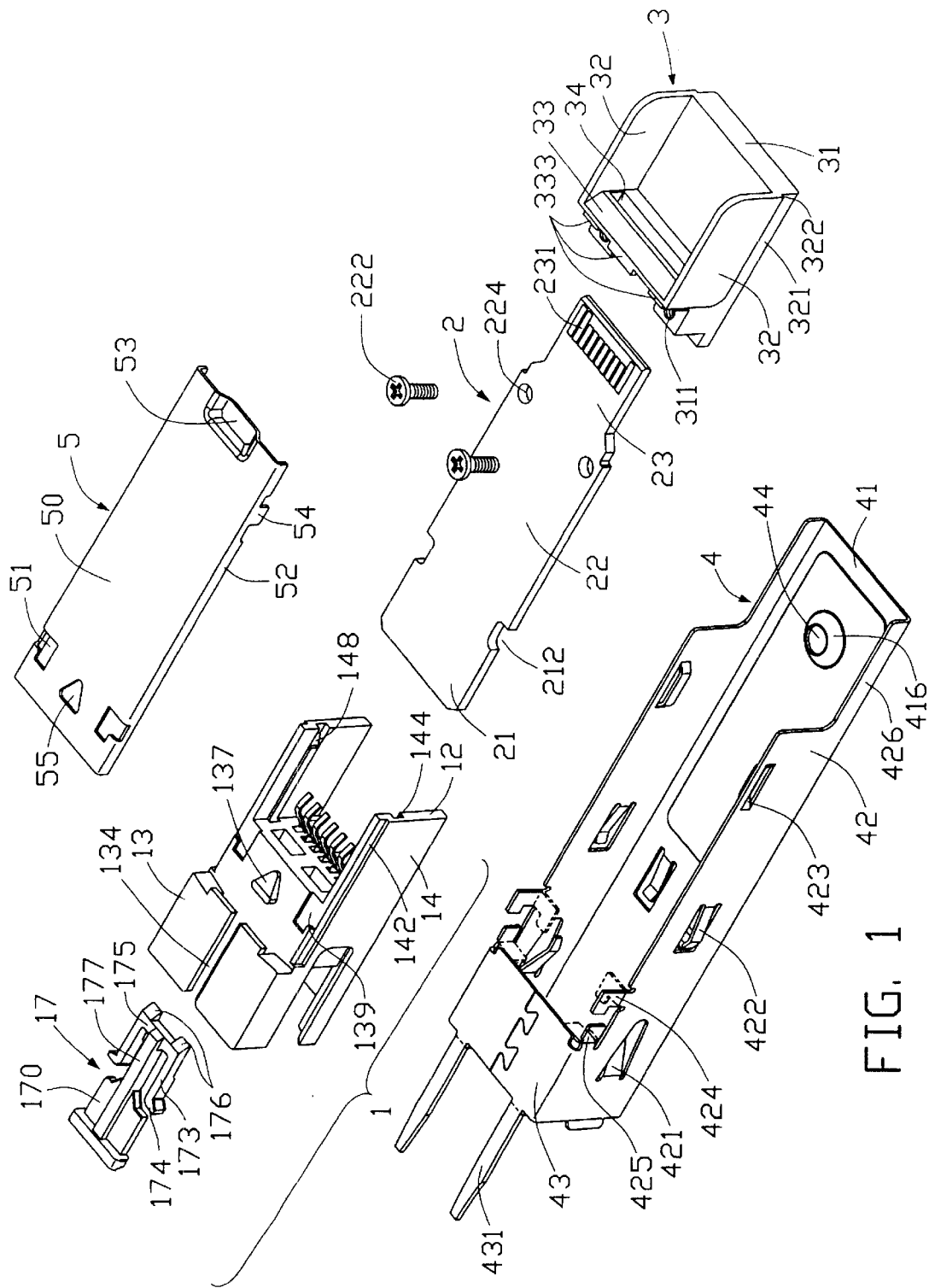
FIG. 1 is an exploded perspective view of an SFP module assembly in accordance with the present invention, viewed from a bottom aspect.

Referring to FIG. 1, a small form-factor pluggable (SFP) module assembly in accordance with the present invention comprises a housing 1, a printed circuit board (PCB) 2, a base 3, an upper cover 4 and a lower cover 5. The PCB 2 is retained by and between the housing 1 and the base 3. The upper and lower covers 4, 5 cooperatively form an enclosure that encases the housing 1, the PCB 2 and the base 3 therein.

Figure 3:
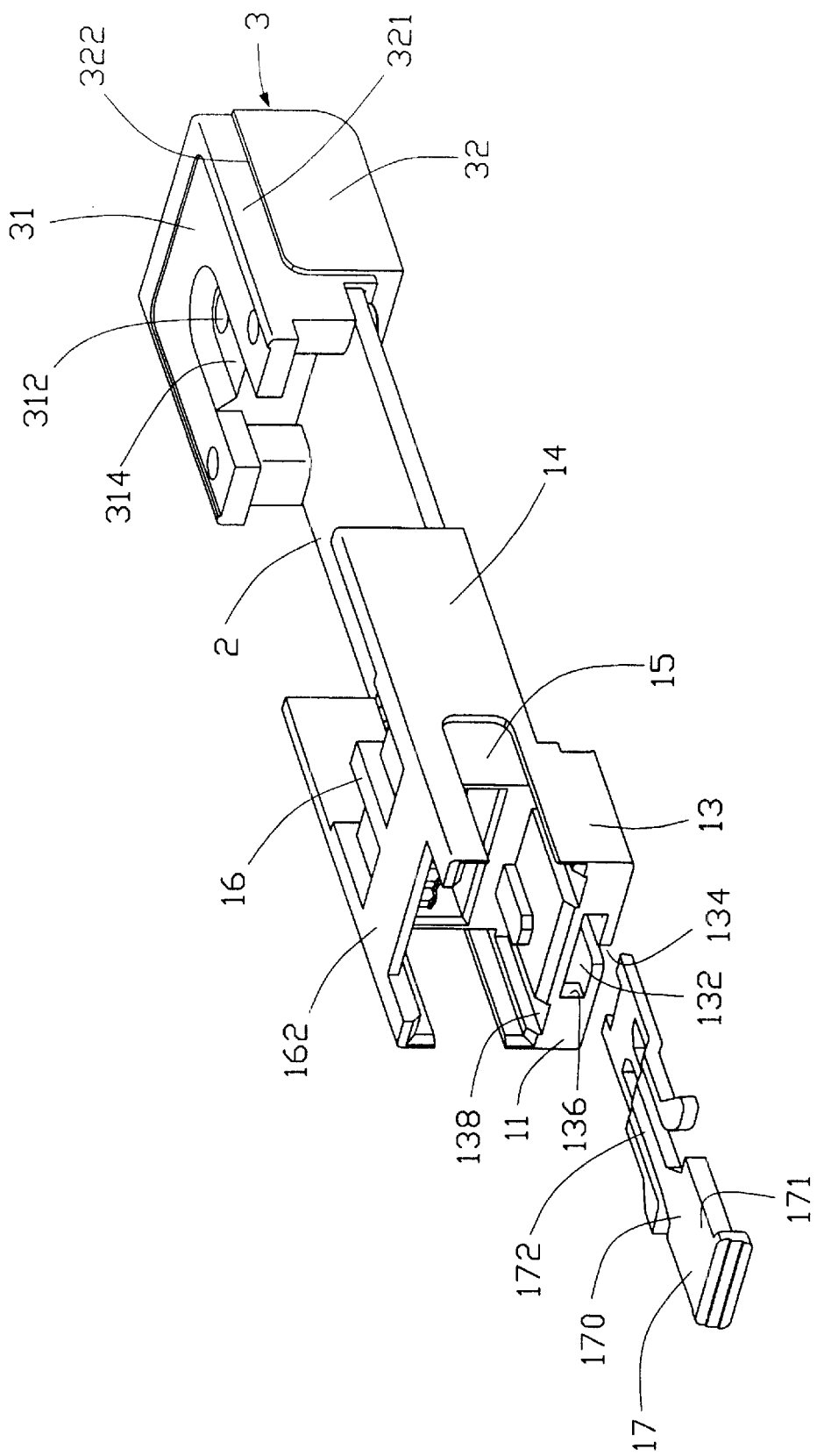
FIG. 3 is also an assembled view of the receptacle, the base and the PCB of the SFP module assembly of FIG. 1, but additionally showing an ejector of the SFP module assembly, and viewed from a top aspect.
Figure 4:
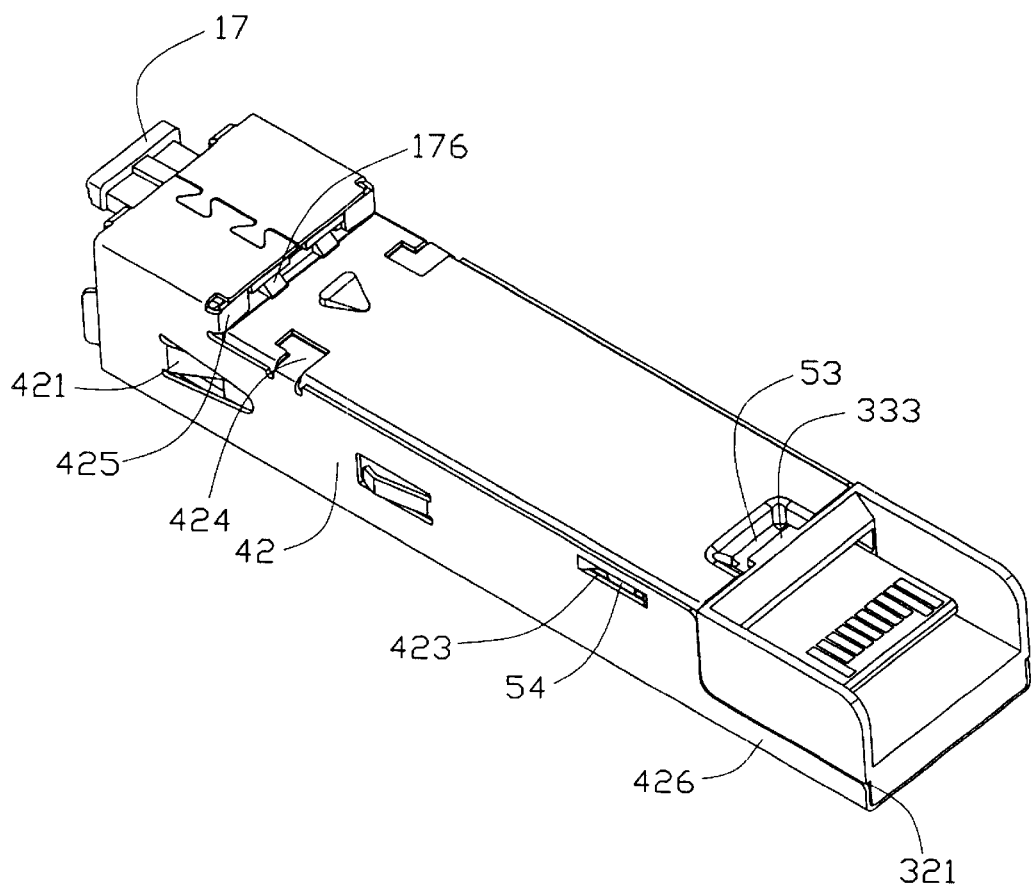
FIG. 4 is an assembled view of the SFP module assembly of FIG. 1.

Referring to FIGS. 1, 3 and 4, the housing 1 is generally made of plastic material. The housing 1 comprises a front end 11, a rear end 12, a lower portion 13, two parallel and opposite sidewalls 14 extending generally upwardly from the lower portion 13, a bracket 15, an upper portion 16, and an ejector 17. The bracket 15 is integrally enclosed by the lower portion 13, the sidewalls 14 and the upper portion 16. A front section of the lower portion 13 forms an ejector seat 132. A longitudinal guide slot 134 is defined in a front middle portion of the ejector seat 132. The ejector seat 132 and guide slot 134 cooperate to slidably receive the ejector 17. Two retaining blocks 136 are formed on the ejector seat 132 on opposite sides of the guide slot 134 respectively, for preventing the ejector 17 from falling out of the ejector seat 132. A triangular latch 137 is integrally formed on a bottom surface of the lower portion 13, rearwardly of the ejector seat 132. A bottom surface of the triangular latch 137 slants upwardly toward the bottom surface of the lower portion 13, from a front end of the triangular latch 137 to a rear end of the triangular latch 137. A pair of symmetric elbow-shaped cutouts 139 is defined in opposite sides of the bottom surface of the lower portion 13 respectively, for engagement with the upper cover 4. Two longitudinal cutouts 142 are defined in bottom outer portions of the sidewalls 14 respectively, for engagement with the lower cover 5. Each longitudinal cutout 142 is in communication with its proximate elbow-shaped cutout 139. A longitudinal groove 144 is defined in an inner surface of each sidewall 14. The grooves 144 are parallel to and opposite to each other, and are for retaining the PCB 2 therein. A block tag 148 is formed on each sidewall 14 in a rear portion of the groove 144, for fixing the PCB 2 in position. Two parallel recesses 138 are defined in an inner surface of the lower portion 13. The upper portion 16 comprises a main plate 162 at a front section thereof. A plurality of conductive contacts (not labeled) is fixed in the bracket 15, for electrically connecting with the PCB 2.

The ejector 17 comprises a push bar (not labeled) at a front end thereof, a main body 170 having a wide front portion 171 and a narrow rear portion 172 (see FIG. 3), and two resilient side wings 173 extending forwardly from a rear end of and on respective opposite sides of the narrow rear portion 172. The resilient side wings 173 are parallel to the narrow rear portion 172. A protrusion 174 extends outwardly from a free end of each resilient side wing 173. A tongue board 175 is formed in a rear portion of the ejector 17. A top surface of the tongue board 175 is lower than a top surface of the main body 170. Two slanted ejecting protrusions 176 are formed at respective opposite sides of a rear end of the tongue board 175. A longitudinal guide rib 177 is formed on a middle of the bottom surface of the main body 170, for slidably engaging in the guide slot 134 of the lower portion 13 of the housing 1.

The PCB 2 comprises a narrow front portion 21, a wide intermediate portion 22 and a narrow rear portion 23. Two rectangular cutouts 212 are respectively defined in opposite side edges of the PCB 2, at a junction of the front portion 21 and the intermediate portion 22. The rectangular cutouts 212 cooperate with the block tags 148 of the housing 1 to fix the PCB 2 in the housing 1. Two through holes 224 are respectively defined near opposite side edges of a rear section of the intermediate portion 22, for extension of screws 222 therethrough to fix the PCB 2 to the base 3. A plurality of connecting pads 231 is formed on the rear portion 23.

Referring to FIGS. 1 and 3, the base 3 comprises an upper portion 31, two parallel opposite sidewalls 32, and a front connecting wall 33 integrally connecting the sidewalls 32. Three generally rectangular positioning blocks 333 are formed on a front face of the front connecting wall 33. The positioning blocks 333 are arranged in a generally triangular formation for engaging with the upper cover 4. A rectangular opening 34 is defined in the front connecting wall 33, for insertion of the PCB 2 therethrough. Two screw holes 311 are defined in a front section of the upper portion 31, for engagingly receiving the screws 222. Each sidewall 32 has an indented top portion 321, thereby forming a step 322. A recess 314 is defined in a top surface of the upper portion 31. A locating hole 312 is defined in the top surface of the upper portion 31 at the recess 314, for engagingly receiving a screw (not shown).

Figure 5:
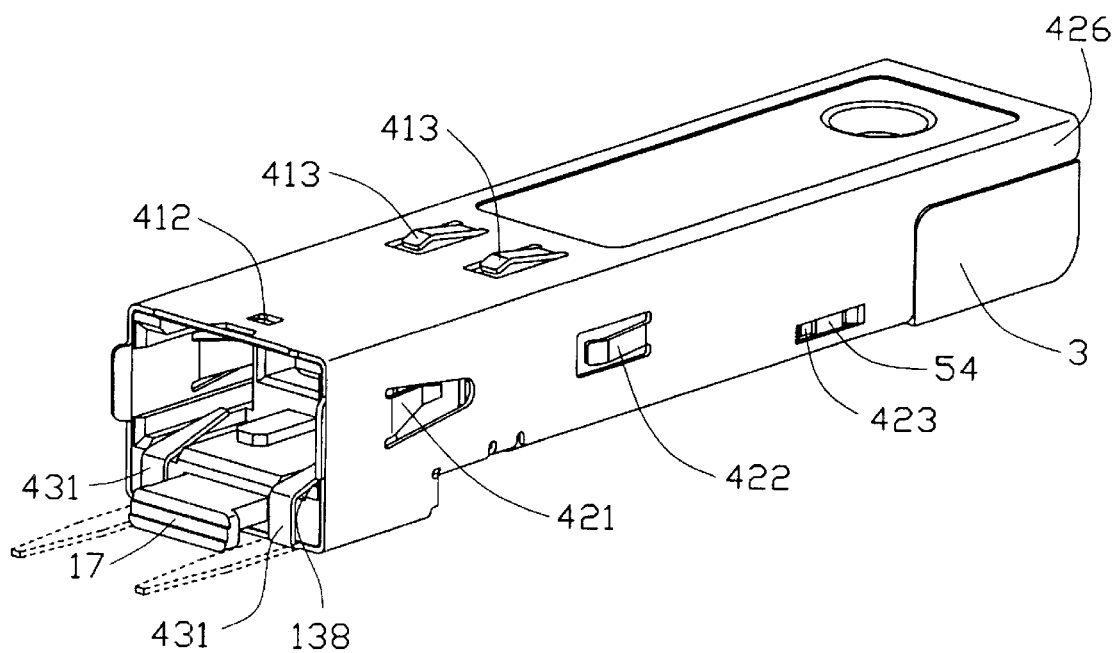
FIG. 5 is also an assembled view of the SFP module assembly of FIG. 1, but viewed from a top aspect.

Referring to FIGS. 1 and 5, the upper cover 4 is generally made of metal. The upper cover 4 comprises an upper plate 41, two sidewalls 42 integrally depending from the upper plate 41, and a bottom plate 43 formed between front portions of the sidewalls 42. Each sidewall 42 has a slender rear portion 426. A distance between the sidewalls 42 is substantially equal to a distance between the indented top portions 321 of the base 3. A bent tab 421 extends inwardly from the front portion of each sidewall 42. A grounding finger 422 is formed in a middle portion of each sidewall 42. A reception socket 423 is formed in a lower rear portion of each sidewall 42. A countersunk portion 416 is formed in a middle of a rear portion of the upper plate 41. A countersunk hole 44 is defined in a middle of the countersunk portion 416, for extension of the screw (not shown) therethrough. Two spaced elongate locking tabs 431 integrally extend forwardly from a front edge of the bottom plate 43. A stop 412 (see FIG. 5) is inwardly stamped from a middle of a front portion of the upper plate 41. Two grounding fingers 413 are formed in a middle portion of the upper plate 41. Two elbow-shaped locking tabs 424 integrally depend from respective opposite bottom edges of the sidewalls 42 near the bottom plate 43, for being engagingly received in the elbow-shaped cutouts 115 of the housing 1. Two rectangular tabs 425 integrally extend rearwardly from the front portions of the sidewalls 42 at the bottom plate 43 respectively, for fixedly retaining the housing 1.

Referring to FIGS. 1 and 4, the lower cover 5 is generally made of metal, and has a main panel 50. A pair of flanges 52 extends from opposite longitudinal sides of the main panel 50 respectively. A pair of symmetric elbow-shaped cutouts 51 is respectively defined in opposite sides of a front portion of the lower cover 5, corresponding to the elbow-shaped cutouts 139 of the housing 1. A triangular hole 55 is defined in a middle of the front portion of the lower cover 5 between the elbow-shaped cutouts 51, for receiving the triangular latch 137 of the housing 1. A recessed portion 53 is formed in a rear portion of the lower cover 5. The recessed portion 53 is dimensioned to engage with the positioning blocks 333 of the base 3. Two positioning tabs 54 (only one visible) extend from rear portions of the flanges 52 respectively, for engaging in the reception sockets 423 of the upper cover 4.

Figure 2:
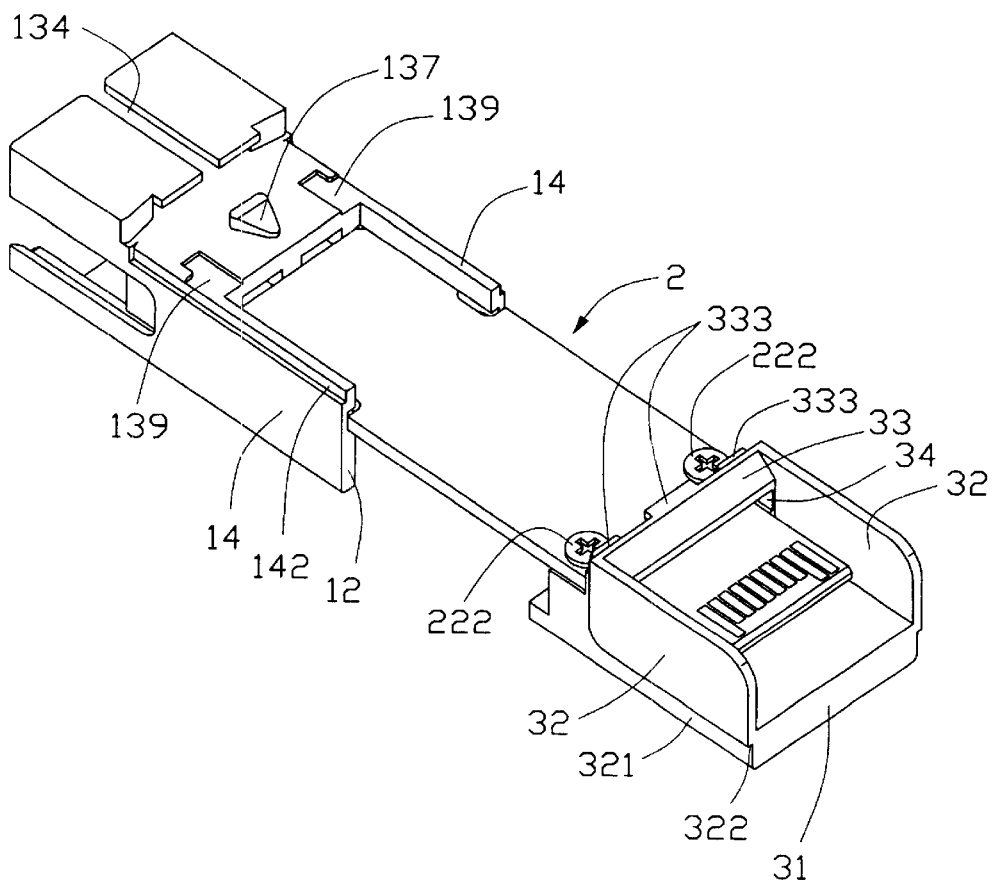
FIG. 2 is an assembled view of a receptacle, a base and a PCB of the SFP module assembly of FIG. 1.

Referring to FIGS. 1–3, in attaching the PCB 2 to the housing 1, the front portion 21 of the PCB 2 is snappingly inserted into a rear of the housing 1. The opposite side edges of the PCB 2 are received in the grooves 144 of the housing 1. The blocking tags 148 of the housing 1 tightly engage in the rectangular cutouts 212 of the PCB 2. In attaching the base 3 to the combined housing 1 and PCB 2, the rear portion 23 of the PCB 2 is inserted into the opening 34 of the base 3. The rear portion 23 is fixed to the upper portion 31 of the base 3 by conventional means. The screws 222 are inserted through the holes 224 of the PCB 2 to threadedly engage in the screw holes 311 of the base 3.

Referring to FIGS. 1, 4 and 5, the lower cover 5 is then attached to the pre-assembled SFP module comprising part of the housing 1, the PCB 2 and the base 3. The elbow-shaped cutouts 51 of the lower cover 5 are aligned with the elbow-shaped cutouts 139 of the housing 1. The recessed portion 53 of the upper cover 5 is engaged with the positioning blocks 333 of the base 3. The flanges 52 of the lower cover 5 are fittingly engaged in the longitudinal cutouts 142 of the housing 1. The triangular latch 137 of the housing 1 extends through the triangular hole 55 of the lower cover 5.

The ejector 17 is then snapped into the ejector seat 132 of the housing 1. The ejector seat 132 and the guide slot 134 of the housing 1 cooperate to slidably receive the ejector 17. The guide slot 134 of the ejector seat 132 slidingly receives the guide rib 177 of the ejector 17. The resilient side wings 173 of the ejector 17 prevent the ejector from falling out of the ejector seat 132. A bottom face of the front portion of the lower cover 5 is firmly held by the ejecting protrusions 176 of the tongue board 175 of the ejector 17 (see FIG. 4). The push bar (not labeled) of the ejector 17 is exposed forward of the front end 11 of the housing 1.

Finally, the upper cover 4 is attached to the combined pre-assembled SFP module and lower cover 5. A forward edge of the main plate 162 of the housing 1 abuts against the stop 412 of the upper cover 4. The stop 412 thereby prevents over-insertion of the pre-assembled SFP module and lower cover 5 into the upper cover 4. The positioning tabs 54 of the lower cover 5 are engagingly received in the reception sockets 423 of the upper cover 4. The countersunk portion 416 of the upper cover 4 is received in the recess 314 of the base 3. The indented top portions 321 of the base 3 snugly abut inner surfaces of the slender rear portions 426 of the upper cover 4. The steps 322 of the base 3 abut corresponding edges of the slender rear portions 426. The screw (not shown) is extended through the countersunk hole 44 of the upper cover 4 to threadedly engage in the locating hole 312 of the base 3. A head of the screw (not shown) is located below or flush with a top face of the upper plate 41 of the upper cover 4. The upper cover 4 is thereby firmly engaged with the base 3. The elbow-shaped locking tabs 424 of the upper cover 4 are bent inwardly and upwardly, and are respectively engagingly received in the elbow-shaped cutouts 139 of the housing 1. The elongate locking tabs 431 of the upper cover 4 are bent backwardly and inwardly, and are respectively engaged in the recesses 138 of the housing 1. The rectangular locking tabs 425 are bent inwardly and respectively engaged in two opposite recesses (not labeled) of the lower portion 13 of the housing 1.

It will be apparent to those having ordinary skill in the field of the present invention that the triangular latch 137 may be formed on a bottom surface of the main panel 50 of the lower cover 5 instead of being formed on the housing 1. This enhances durability of the triangular latch 137 when the SFP module is used in a complementary SFP receptacle (not shown).

Although the present invention has been described with specific terms, it should be noted that the described embodiment is not necessarily exclusive, and that various changes and modifications may be made thereto without departing from the scope of the present invention as defined in the appended claims.

What is claimed is:

1. Packing means for a small form-factor pluggable module, the packing means comprising:
    a first cover comprising two sidewalls, each of the sidewalls having at least one elbow-shaped tab extending therefrom; and
    a second cover comprising a main panel, at least two, cutouts being defined in the main panel;
    wherein each of the tabs of the first cover is bendable to be engaged in one corresponding cutout of the second cover, thereby securing the first and second covers together,
    wherein the second cover comprises a pair of flanges extending from opposite longitudinal sides of the main panel respectively, and two tabs extending from rear portions of the flanges respectively, and wherein a reception socket is formed in a lower rear portion of each of the sidewalls of the first cover for engagingly receiving a corresponding tab of the second cover therein; and
    wherein the first cover comprises a bottom plate formed between front portions of the sidewalls, two locking tabs integrally extending from a front edge of the bottom plate, and two locking tabs integrally extending from the front portions of the sidewalls respectively.

2. The packing means in accordance with claim 1, wherein the first cover further comprises a stop inwardly formed from the upper plate.

3. The packing means in accordance with claim 1, wherein the first cover comprises two grounding fingers formed in the sidewalls respectively, and at least one grounding finger formed in the upper plate.

4. The packing means in accordance with claim 1, wherein the second cover further comprises a hole defined in the main panel, for extension of a latch of the small form-factor pluggable module therethrough.

5. The packing means in accordance with claim 1, wherein the second cover further comprises a latch formed on the main panel.

6. The packing means in accordance with claim 1, wherein a recessed portion is formed in a rear portion of the second cover, for engaging with the small form-factor pluggable module.

7. Packing means for a small form-factor pluggable module, the packing means comprising:
    a first cover comprising an upper plate, two sidewalls and a bottom plate, the bottom plate comprising at least two elongate locking tabs extending from a front edge thereof, the locking tabs being bendable to fasten with the small form-factor pluggable module, each of the sidewalls comprising at least one reception socket; and
    a second cover comprising a main panel, the main panel comprising at least two tabs engagingly received in the reception sockets of the first cover,
    wherein the first cover further comprises at least two elbow-shaped locking tabs integrally extending from respective bottom edges of the sidewalls, and the second cover further comprises at least two elbow-shaped cutouts respectively defined in opposite sides of the main panel, the at least two elbow-shaped cutouts allowing extension of the at least two elbow shaped locking tabs of the first cover therethrough;
    and wherein a recessed portion is formed in a rear portion of the second cove, for engaging with the small form-factor pluggable module.

8. The packing means in accordance with claim 7, wherein the second cover further comprises a hole defined in the main panel, for extension of a latch of the small form-factor pluggable module therethrough.

9. The packing means in accordance with claim 7, wherein the second cover further comprises a latch formed on the main panel.

10. The packing means in accordance with claim 7, wherein the first cover further comprises a stop inwardly stamped from the upper plate.

11. The packing means in accordance with claim 7, wherein the first cover further comprises two locking tabs integrally extending from front portions of the sidewalls respectively.

12. The packing means in accordance with claim 7, wherein the first cover comprises two grounding fingers formed in the sidewalls respectively, and at least one grounding finger formed in the upper plate.

13. A small form-factor pluggable module assembly comprising:
    a housing;
    a PCB engaged with the housing;
    a first cover covering the housing and the PCB, the first cover comprising two sidewalls, each of the sidewalls comprising at least one tab extending therefrom;
    a second cover covering the PCB and partially arranged on the housing, the second cover comprising a main panel, the main panel defining at least two cutouts therein and;
    a base connected with a rear end of the PCB, wherein a front of the base comprises three positioning blocks arranged in a triangular formation, a recessed portion is formed in a rear portion of the main panel of the second cover, and the recessed portion engages with the blocks of the base,
    wherein each of the tabs of the first cover is bendable and can be engaged in and arranged in one corresponding cutout of the second cover, thereby securing the first and second covers together;

wherein a reception socket is formed in each of sidewalls of the first cover, the second cover further comprises a pair of flanges extending from opposite longitudinal sides of the main panel respectively, and two tabs respectively extend from the flanges and are retained in the reception sockets.

14. The small form-factor pluggable module assembly in accordance with claim 13, wherein the housing forms a latch thereon, the main panel of the second cover defines a corresponding hole therein, and the latch extends through the hole.

15. The small form-factor pluggable module assembly in accordance with claim 13, wherein the second cover further comprises a latch formed on the main panel.

16. The small form-factor pluggable module assembly in accordance with claim 13, wherein the first cover further comprises a stop inwardly stamped from the upper plate.

17. The small form-factor pluggable module assembly in accordance with claim 13, wherein the first cover further comprises a bottom plate formed between front portions of the sidewalls, two tabs integrally extending from a front edge of the bottom plate, and two tabs integrally extending from the front portions of the sidewalls respectively.

18. The small form-factor pluggable module assembly in accordance with claim 13, wherein the tabs of the first cover and the cutouts of the second cover are elbow-shaped.

\* \* \* \* \*